(12) United States Patent
Mermoud et al.

(10) Patent No.: US 11,824,766 B2
(45) Date of Patent: Nov. 21, 2023

(54) ADAPTIVE SELECTION OF NETWORK PATHS BASED ON LONG-TERM PREDICTIONS OF USER EXPERIENCE

(71) Applicant: Cisco Technology, Inc., San Jose, CA (US)

(72) Inventors: Grégory Mermoud, Venthône (CH); Jürg Nicolaus Diemand, Pfaffikon (CH); Gad Miller, Paris (FR); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 17/720,016

(22) Filed: Apr. 13, 2022

(65) Prior Publication Data

US 2023/0336464 A1     Oct. 19, 2023

(51) Int. Cl.
   *H04L 45/302*     (2022.01)
   *H04L 45/12*      (2022.01)
   *H04L 45/125*     (2022.01)

(52) U.S. Cl.
   CPC .......... *H04L 45/302* (2013.01); *H04L 45/125* (2013.01); *H04L 45/126* (2013.01)

(58) Field of Classification Search
   CPC .... H04L 45/302; H04L 45/125; H04L 45/126
   See application file for complete search history.

(56) References Cited

U.S. PATENT DOCUMENTS

| | | | | |
|---|---|---|---|---|
| 9,338,082 B2 * | 5/2016 | Liu | | H04L 45/125 |
| 10,862,771 B2 * | 12/2020 | Tomkins | | H04L 69/22 |
| 10,904,143 B2 * | 1/2021 | Chu | | G06F 9/45558 |
| 11,134,023 B2 * | 9/2021 | Thiel | | H04L 47/805 |
| 2014/0269331 A1 * | 9/2014 | Pfeifer | | H04L 45/121 |
| | | | | 370/238 |
| 2018/0027293 A1 * | 1/2018 | Yamamoto | | H04N 21/44209 |
| | | | | 725/86 |
| 2020/0374215 A1 * | 11/2020 | Shah | | H04L 43/028 |
| 2021/0044530 A1 * | 2/2021 | Dhanabalan | | H04L 41/0894 |
| 2022/0070086 A1 | 3/2022 | Mermoud et al. | | |
| 2022/0321261 A1 * | 10/2022 | Bajaj | | H04L 1/08 |
| 2023/0116881 A1 * | 4/2023 | Mehta | | H04L 45/123 |
| | | | | 709/238 |

OTHER PUBLICATIONS

"How to Use Predictive Modeling to Produce Self-Healing Networks", online: https://versa-networks.com/resources/webinars/how-to-use-predictive-modeling-to-produce-self-healing-networks.php, accessed Apr. 13, 2022, 3 pages, Versa Networks.

* cited by examiner

*Primary Examiner* — Chi H Pham
*Assistant Examiner* — Weibin Huang
(74) *Attorney, Agent, or Firm* — BEHMKE INNOVATION GROUP LLC; Kenneth J. Heywood; James J. Wong

(57) ABSTRACT

In one embodiment, a device predicts, for each of a set of paths via which traffic for an online application can be routed, a distribution of an application experience metric for the online application. The device computes, for different subsets of the set of paths, aggregated distributions of their distributions of the application experience metric predicted by the device. The device makes comparisons between the aggregated distributions for the different subsets of the set of paths. The device causes, based on the comparisons, the traffic for the online application to be routed via a particular subset of the set of paths.

20 Claims, 12 Drawing Sheets

ADAPTIVE SELECTION OF NETWORK PATHS BASED ON LONG-TERM PREDICTIONS OF USER EXPERIENCE

TECHNICAL FIELD

The present disclosure relates generally to computer networks, and, more particularly, to the adaptive selection of network paths based on long-term predictions of user experience.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling path metrics such as delay, jitter, packet loss, etc. for a network path can be used to predict when that path will violate the SLA of the application and reroute the traffic, in advance. However, in real deployments, tradeoffs may still need to be made with respect to the degree of granularity of the predictions. For instance, while it may be possible to predict SLA violations on a per-path and per-application basis every hour for the next twenty four hours, using such a fine grained approach would also lead to a large number of predictions to address, which may be too much for the network administrator and/or the SD-WAN controller to handle. Indeed, even if routing decisions were to be triggered automatically by the predictions, many administrators are still very hesitant to enable fully automatic control over their networks. Accordingly, there are situations where global decision making is more desirable that rely on longer term forecasts and the expected distribution of application disruptions over time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
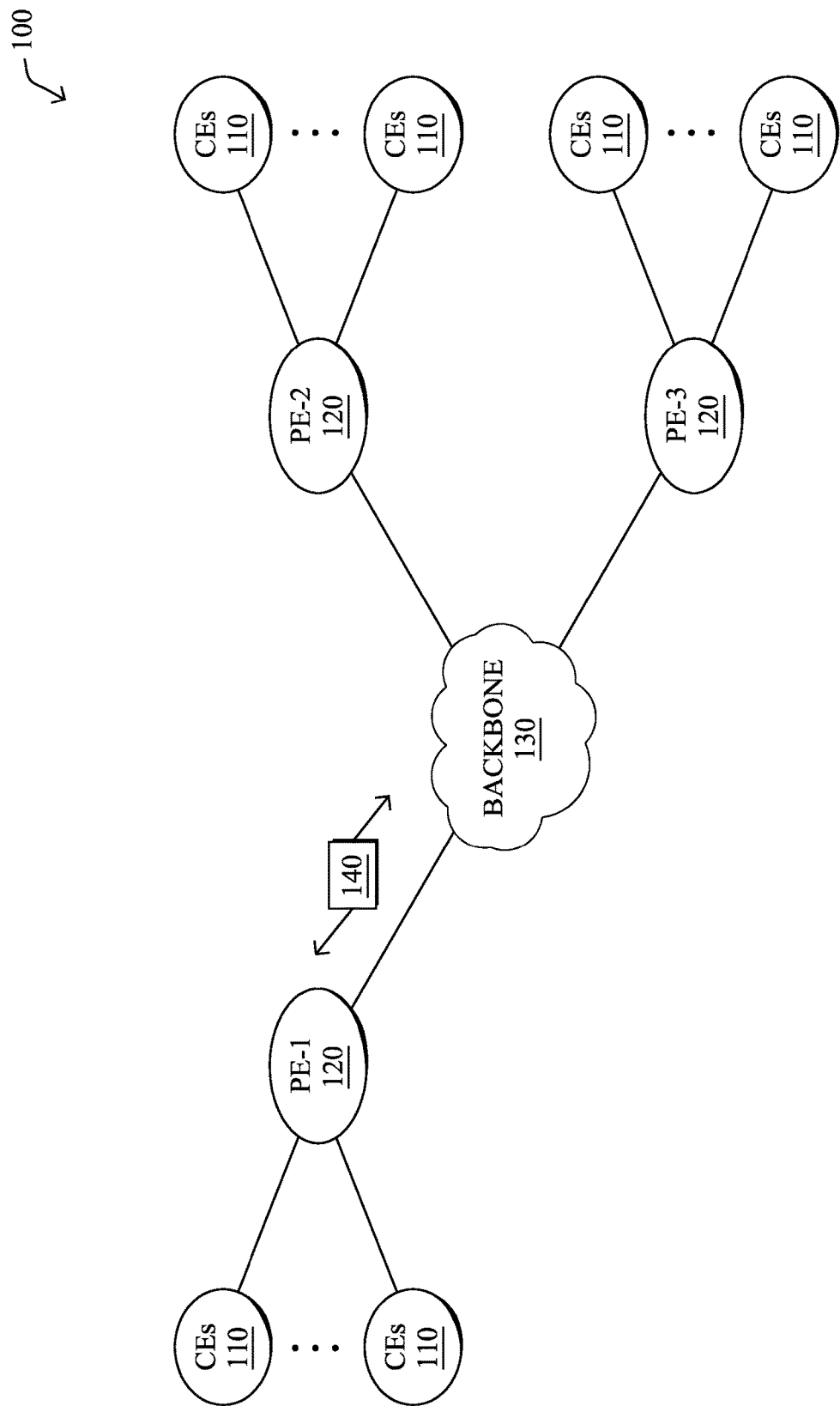
FIGS. 1A-1B illustrate an example communication network.

According to one or more embodiments of the disclosure, a device predicts, for each of a set of paths via which traffic for an online application can be routed, a distribution of an application experience metric for the online application. The device computes, for different subsets of the set of paths, aggregated distributions of their distributions of the application experience metric predicted by the device. The device makes comparisons between the aggregated distributions for the different subsets of the set of paths. The device causes, based on the comparisons, the traffic for the online application to be routed via a particular subset of the set of paths.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
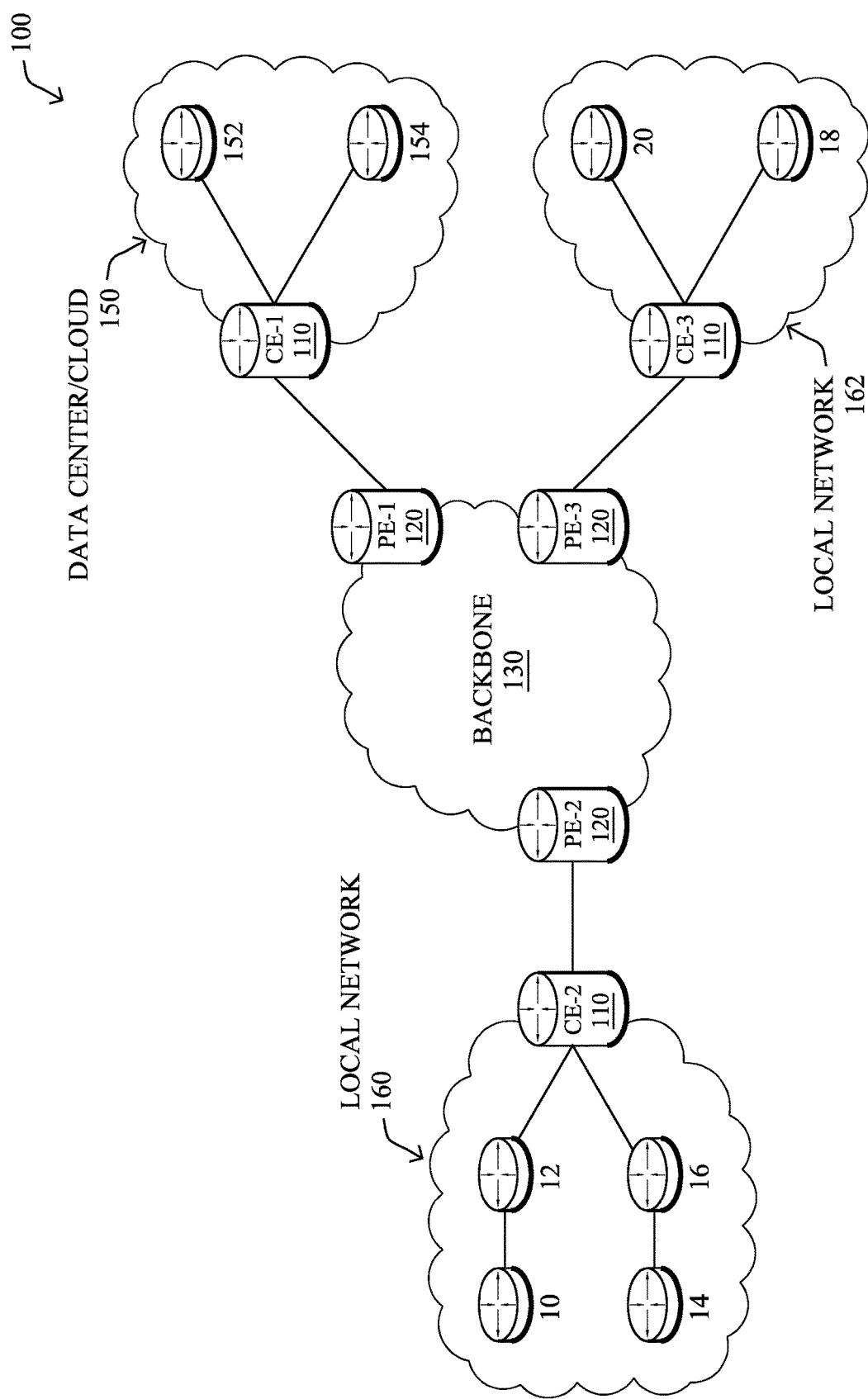

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
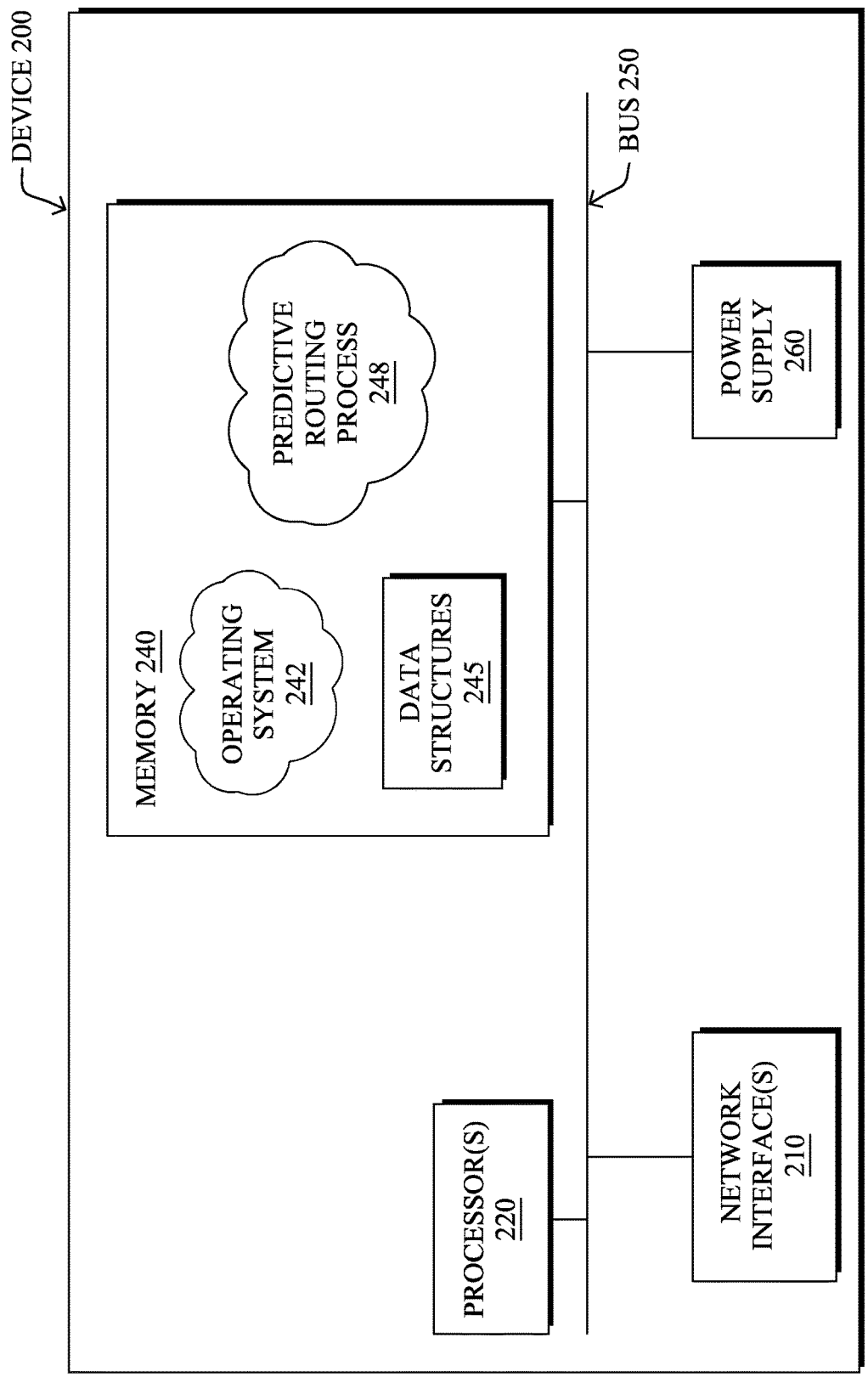
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that it satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
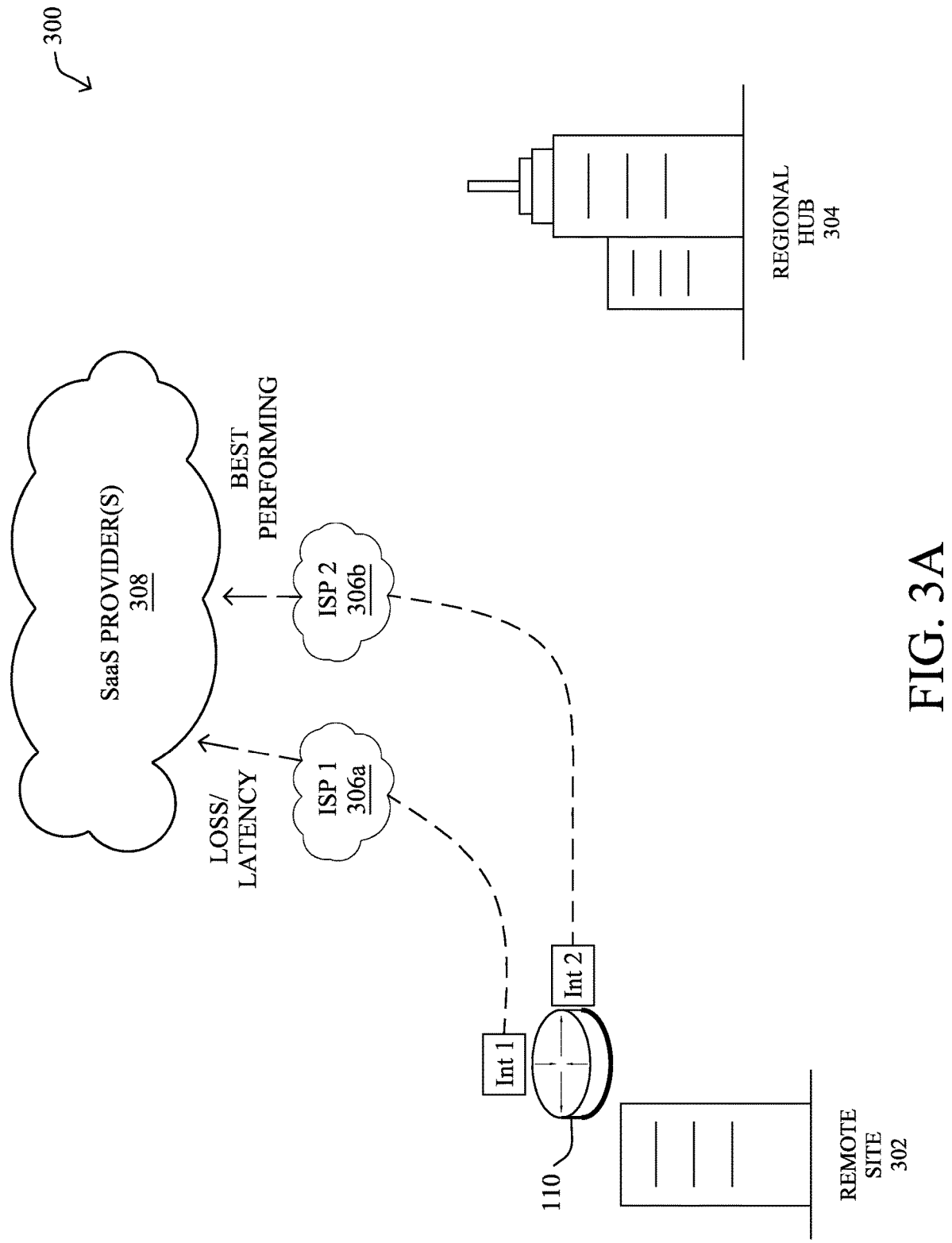
FIGS. 3A-3B illustrate example network deployments.
Figure 3B:
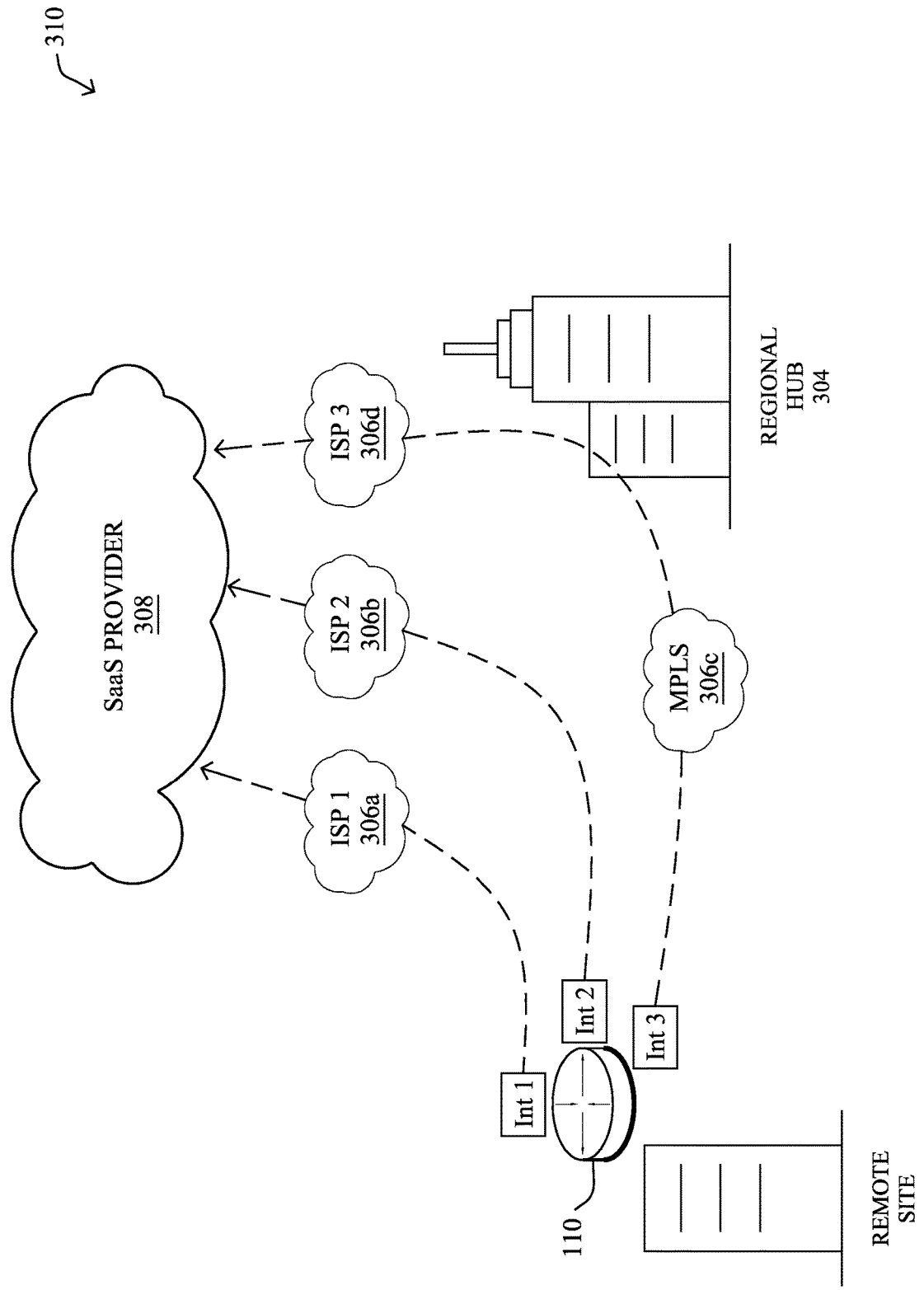

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
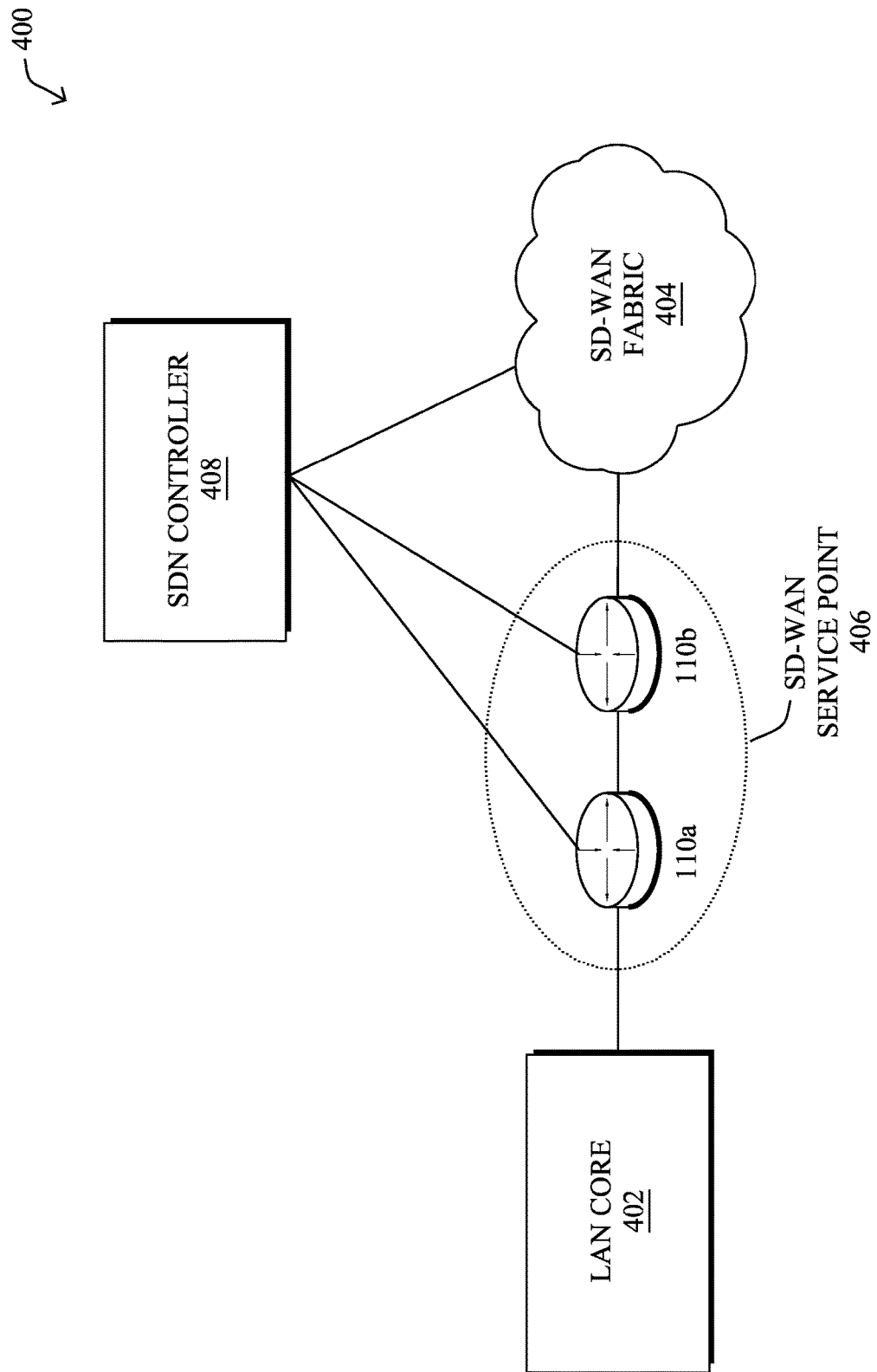
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and -fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:
- New in-house applications being deployed;
- New SaaS applications being deployed everywhere in the network, hosted by a number of different cloud providers;
- Internet, MPLS, LTE transports providing highly varying performance characteristics, across time and regions;
- SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending Hypertext Transfer Protocol (HTTP) probes along various paths from a branch office and then route the application's traffic along a path having the best QoE for the application. At a first sight, such an approach may solve many problems. Unfortunately, though, there are several shortcomings to this approach:
- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
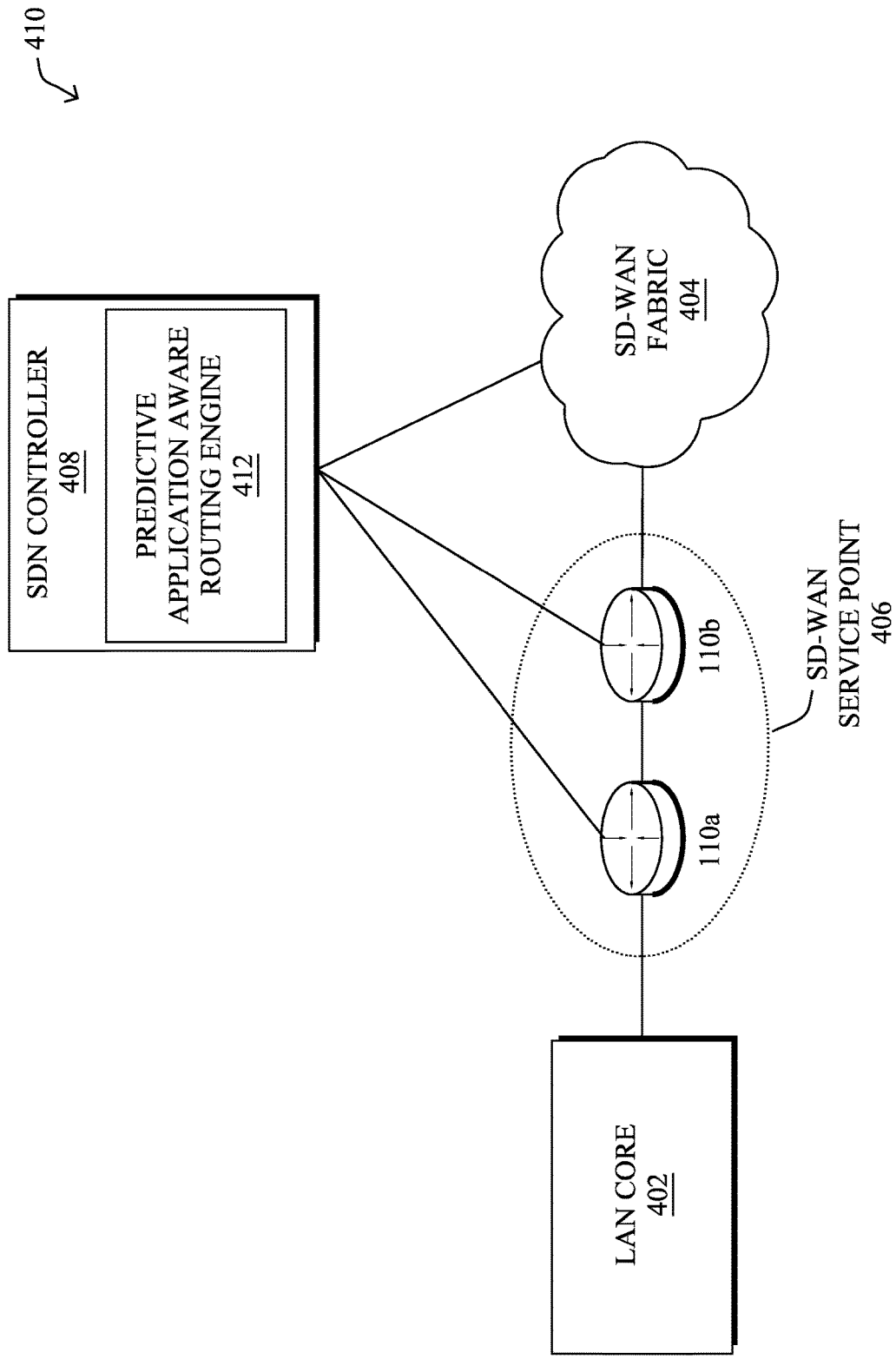

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:
- Obtaining user feedback directly from the application
- Applying traffic analytics, such as by analyzing Netflow records that include extra metrics like Application Response Time (ART)
- Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, while it may be entirely possible for predictive application aware routing engine 412 to make fine-grained predictions regarding the application experience metric for an application on a per-path basis (e.g., hourly predictions for the next twenty four hours), there are several challenges to employing such an approach in real-world deployments, due to the sheer volume of the fine-grained predictions. First, many administrators are still hesitant to enable fully automatic control over their networks and manually making rerouting decisions. In addition, the network controller, such as SDN controller 408, may not be able to handle that that large a number of predictions, especially in cases of very large networks. Accordingly, there are situations where global decision making is more desirable that rely on longer term forecasts and the expected distribution of application disruptions over time Adaptive Selection of Network Paths Based on Long-Term Predictions of User Experience The techniques herein allow for the selection of network paths based on long-term predictions of user experience. In some aspects, the techniques herein leverage a generative model to make long-term predictions as to the application experience metrics of different paths. In addition, aggregation techniques are also introduced herein so as to constantly adapt the set of paths used to route traffic for a certain application. Such adaptations can also take the form of recommendations that are constantly reevaluated by the system, based on the most recent predictions using a stateful approach.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device predicts, for each of a set of paths via which traffic for an online application can be routed, a distribution of an application experience metric for the online application. The device computes, for different subsets of the set of paths, aggregated distributions of their distributions of the application experience metric predicted by the device. The device makes comparisons between the aggregated distributions for the different subsets of the set of paths. The device causes, based on the comparisons, the traffic for the online application to be routed via a particular subset of the set of paths.

Figure 5:
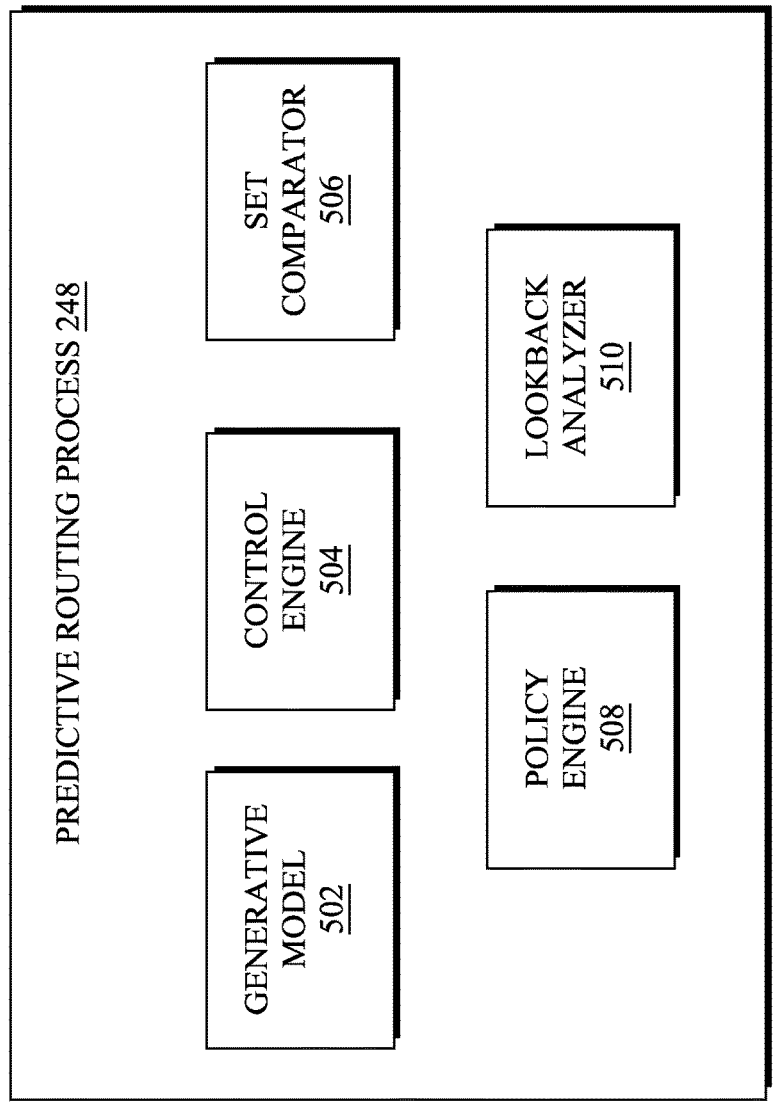
FIG. 5 illustrates an example architecture for the adaptive selection of network paths based on long-term predictions of user experience.

Operationally, FIG. 5 illustrates an example architecture 500 for the adaptive selection of network paths based on long-term predictions of user experience, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 500 may be implemented as part of a SASE deployment.

As shown, architecture 500 may include any or all of the following components: a forecasting engine 502, a control engine 504, a set comparator 506, a policy engine 508, and/or a lookback analyzer 510. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

Before diving into the various components of predictive routing process 248, it should first be noted that the techniques herein are primarily concerned with the concept of an application experience metric indicative of the subjective perception of the application experience from the perspective of its users. Such a metric may be based, for instance, on satisfaction feedback provided by users of the application and may be scaled between any meaningful bounds (e.g., 1-5 stars, on a scale of 1-100, on a scale of 0-1, etc.). In one embodiment, the application experience metric may take the form of a mean opinion score (MOS) metric. In further embodiments, the metric could take the form of the compliment of the probability of an SLA violation, Q=1−PSLAV, where PSLAV is the probability of the jitter, delay, loss, or other path metric being outside of given boundary, such as when direct user feedback is not available.

As shown, forecasting engine 502 may include a predictive model trained to predict the full distribution of the application experience metric for a given application, as it would be obtained in the long term for a given path P. Note that this is in contrast to systems that simply predict a mere scalar probability for the next short-term time interval. For instance, in contrast to a system that simply predicts the probability of an SLA violation in the next hour, forecasting engine 502 may predict the full probability distribution for the path. Formally, given a feature vector x, the model M of forecasting engine 502 may yield:

$$M_{A,P}(X)=f_Q$$

where $f_Q$ is a probability density function, such that its definite integral between a and b equals the probability that the quality Q lies in the interval [a, b]:

$$P[a \le Q \le b] = \int_a^b f_Q(q)$$

Thus, the model of forecasting engine 502 may be a generative model, since it essentially acts as a joint probability distribution P(X, Q) between an observable random variable X (whose x is an observation) and a target variable Q. In some embodiments, the model of forecasting engine 502 may take the form of a Naïve Bayes model with Gaussian distributions, in which case Q is assumed to be normally distributed and $f_Q$ is fully determined by its mean and variance.

By predicting the full distribution Q, this allows for evaluations to be made as to the various potential outcomes of a decision (i.e., routing the traffic of application A over a given path P). While the above approach provides for the generative model to be subscribed by a particular application and path combination, further embodiments for the use of a single model for multiple paths, applications, or both, and convey those as part of the feature vector x, instead.

In various embodiments, predictive routing process 248 may also include control engine 504, which relies on statistical methods to compute aggregated distributions for the distributions predicted by forecasting engine 502. More specifically, control engine 504 may take as input the distributions predicted by forecasting engine 502 for each of a set of paths and aggregate them for different subsets of the set of paths (e.g., every potential path via which traffic for the application may be conveyed). This allows for routing decisions to be made globally instead of on a per-path basis, and as permanently as possible. Note that the goal ere is not to avoid transient, one-time disruptions by temporarily re-routing traffic, but to perform a global and stable decision that will, in the long run, avoid as many such disruptions to the application experience as possible.

To this end, control engine 504 may first compute the compound distribution $f_{Q1}$, $f_{Q2}$, ..., etc. for any or all subsets of paths $S_1$, $S_2$, ..., etc. that are available. In one embodiment, these subsets may be restricted only to those paths that connect via the same set of transports (or interfaces) at the level of a site. In other embodiments, though, the subsets may be arbitrarily granular, all the way down to a per-path selection.

Figure 6:
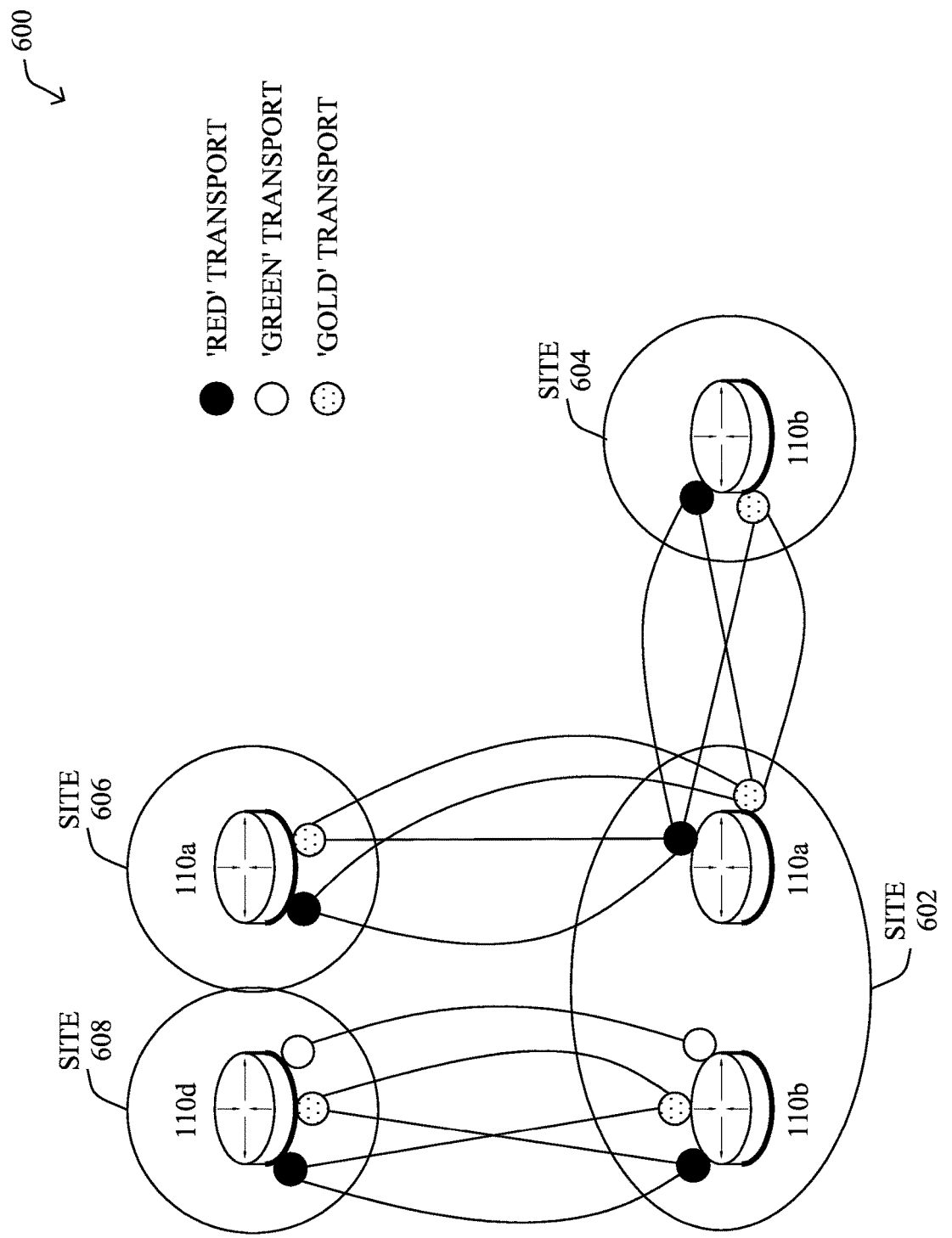
FIG. 6 illustrates an example network having different transports between sites.

By way of example, FIG. 6 illustrates an example network 600 having different transports between sites. More specifically, as shown, assume that network 600 includes the following sites: site 602, site 604, site 606, and site 608. Site 602 includes two routers: router 110*a* and router 110*b*. Site 604 includes router 110*c*, site 606 includes router 110*d*, and site 608 includes router 110*e*.

As would be appreciated, by convention, the various transports (or interfaces) available between these routers are 'colored' (i.e., grouped), with the following colors being used: red, green, and gold. For instance, all three transport types may be supported between site 602 and site 608. However, only the red and gold transports may be supported between site 602 and site 606, as well as between site 602 and site 604. This means, for instance, that traffic between site 608 and site 602 could be routed via any or all of the three available transports between the two.

In such a case, control engine 504 may consider all 2n−1 subsets: {gold}, {red}, {green}, {gold, red}, {gold, green}, {red, green}, {gold, red, green}. Note that the empty set can be ignored, since that is not a viable solution. For each of these subsets, control engine 504 may aggregate the distribution $f_Q$ from every path that connects to any of the transport in that subset.

Thus, by way of example and focusing first on site 602, control engine 504 may compute the distribution $f_Q$ for the option {gold}. To do so, control engine 504 may fetch all individual forecasts from forecasting engine 502 that are connected to the gold transport on any router in A (i.e., router 110*a* and 110*b*, in this instance), which amounts to six paths: two paths between router 110*a* and router 110*c* at site 604, two paths between router 110*a* and router 110*d* at site 606, and two paths between router 110*b* and router 110*e* at site 608. In turn, control engine 504 may aggregate the distributions across all of these paths, while weighing the contributions of every endpoint pair by the total application usage for the application of interest. For instance, if the pair (router 110*a*, router 110*c*) is expected to carry only 1% of the total user sessions from site 602, control engine 504 may weight this pair low in the aggregation. In one embodiment, the expected application usage/load (e.g., amount of traffic, number of sessions, etc.) may be predicted using a forecasting mechanism, similar to how forecasting engine 502 predicts the distributions of the experience quality metric Referring again to FIG. 5, control engine 504 may aggregate the distributions of the experience quality metric from forecasting engine 502 in a number of different ways. In some embodiments, control engine 504 may use a Monte Carlo approach (e.g., Metropolis-Hastings algorithm or Gibbs sampling), to generate samples from the distribution of every individual path and combine them into a single dataset. This can be done with sample counts that are proportional to the weight assigned to each path usage-wise. If the distributions are assumed to have a specific form, control engine 504 could also rely on close-form formulas to perform the aggregation. For instance, assuming that the distributions are Gaussian and that fluctuations in the application experience quality metric are independent (i.e., not correlated across the involved paths), the aggregate mean is the weighted-average of every mean quality, and the aggregate standard deviation is given by the following:

$$\sigma(t_1 q_1 + \ldots + t_E q_E)/(t_1 + \ldots + t_E) = \frac{\sqrt{(t_1 \sigma_{q1})^2 + \ldots (t_E \sigma_{qE})^2}}{t_1 + \ldots + t_E}$$

where $q_i$ are the mean qualities for a given path i and set of colors, and $\sigma_{qi}$ are their standard deviations. The weights $t_i$ are the total application usage between the corresponding endpoint pairs. Note that both the Gaussian shape and the independence of the experience quality metrics are assumptions, which are often quite far from real world network conditions. Still, they may lead to helpful simplifications and to an efficient, robust, and well-performing implementation.

In various embodiments, control engine 504 may employ a stateful algorithm to decide when to trigger an action, to decide when to trigger an action. For instance, such an action may take the form of a recommendation to the network operator to switch the application traffic from a current subset of the possible paths (e.g., a default subset of the possible paths), to another subset that is deemed more favorable from a user experience standpoint (e.g., an optimal subset of the paths).

Figure 7:
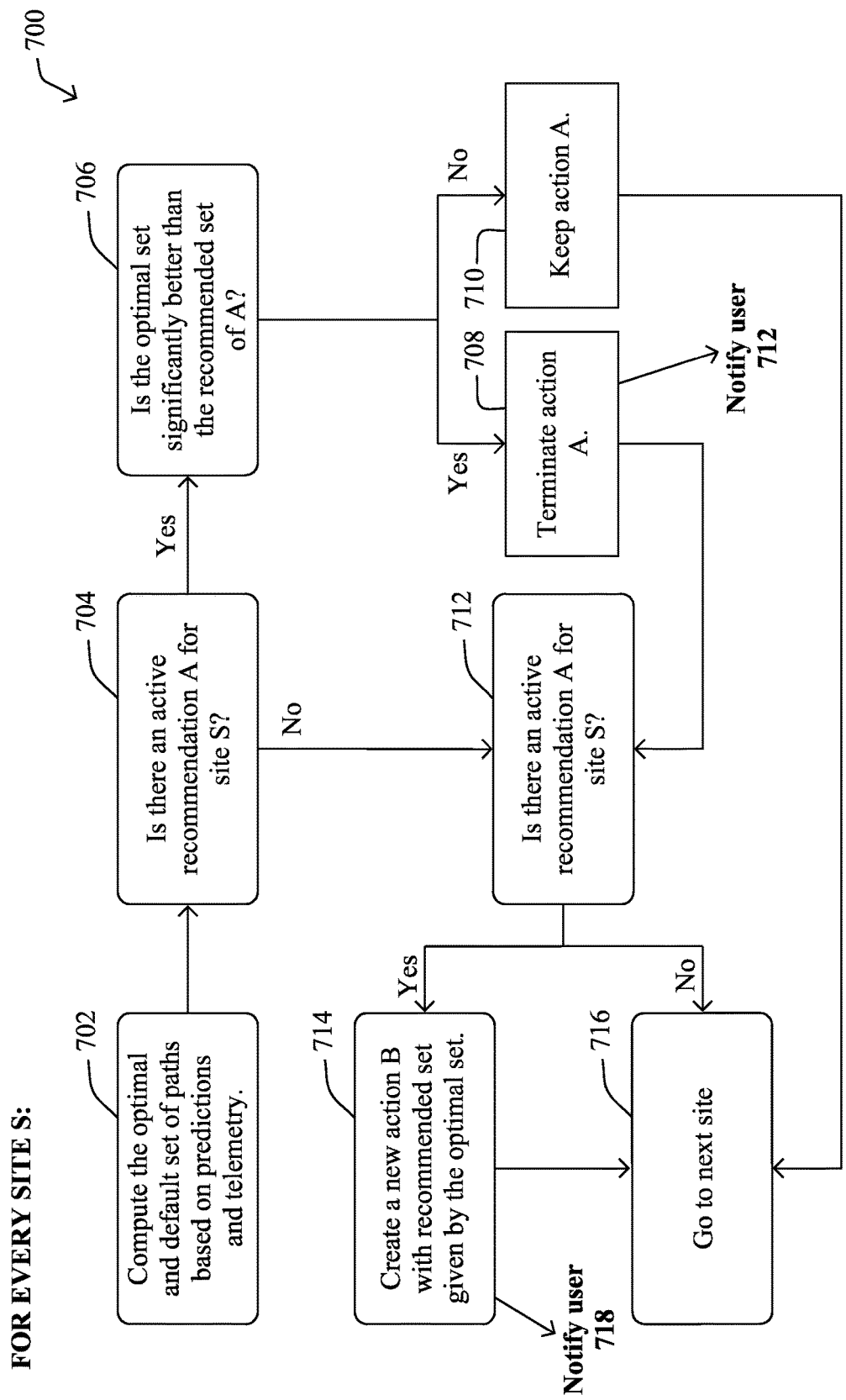
FIG. 7 illustrates an example stateful algorithm to determine when to trigger an action.

FIG. 7 illustrates an example stateful algorithm 700 that control engine 504 may employ, to determine when to trigger an action, in various embodiments. As shown, control engine 504 may, for instance, perform a series of steps during every iteration (e.g., hourly, daily, etc.). More specifically, such a state machine may execute as follows for every site:

1. At step 702, compute the following sets of paths:
   a. The optimal path set, i.e., those paths that are forecasted to (collectively) deliver the best user experience for a given application. Importantly, this may include a notion of congestion risk, wherein a set {A, B} may be preferred over {A}, even if path B is slightly worse than A because balancing traffic over both paths is less risky than using only one (e.g., more overall bandwidth is available).
   b. The default path set, i.e., those paths that are used by the network as part of their network configuration. This can be done by fetching, for instance, the configuration from the network controller (e.g., SDN controller 408), inferred from historical traffic data, or the like. Importantly, note that the optimal and default path sets can be one and the same, in which case there is nothing to be done, in principle.
2. At step 704, decide whether there is an active action A for site S. If so, processing continues on to step 706. Otherwise, processing continues on to step 712.
3. At step 706, if there is an active action A for site S, decide whether the optimal path set determined in 702 is significantly better than the path set recommended by action A. Further explanation as to what may be considered 'significantly better' is discussed further below. If so, the action may be terminated at step 708 and a notification sent to the user at step 712. Otherwise, at step 710, action A is kept and processing continues on to step 716, where the next site is evaluated.

4. At step 712, a decision is made as to whether the optimal set of paths is significantly better than the default set of paths. If, so processing continues to step 714 and a new action B is created with the optimal set becoming the recommended set. A notification can also be sent at step 718 as to the recommended/optimal set. Otherwise, if the optimal set is not significantly better than the default, processing may continue to step 716, where the next site is evaluated.

In further embodiments, a variation to stateful algorithm 700 can be made with respect to step 712. Instead of deciding in step 712 whether the optimal path set determined in step 702 is significantly better than the default path set, step 712 could instead decide whether the optimal path set determined in step 702 is significantly better than the default path set or than the recommended path set from action A, if any.

The key idea behind stateful algorithm 700 is to make a change if and only if the impact is significant and to terminate a change when its risk of being detrimental is intolerable (hysteresis). This stateful approach also introduces a lifecycle of the recommendations made by control engine 504, which allows for more meaningful notifications to be sent to the network operator. Note that this procedure also allows for the termination and creation of actions in the same iteration. For instance, if network conditions changed on a given transport, control engine 504 can terminate a given action A1 that recommends {gold} and create immediately an action A2 that recommends {red}, without necessarily restoring the default configuration.

From the above procedure, at every iteration of the stateful algorithm of control engine 504, an action can be terminated, and another created for every site, which essentially corresponds to a routing update (i.e., switching from a given recommended set to a different one). The requirement that the new configuration must be predicted to perform "significantly better" also adds a natural hysteresis to the decision process that may lead to long-lived, stable actions.

Referring again to FIG. 5, set comparator 506 may be responsible for comparing the sets of paths (e.g., the different subsets of the full set of possible paths), to determine whether one of them is "significantly better" than another, in various embodiments. As would be appreciated, the answer to this question may differ, depending on conditions, which may be predefined or set by an administrator. For instance, set comparator 506 may employ a much stricter definition upon creating an action than upon terminating it, thus making the system very prudent by sending a recommended routing change, if and only if the outcome is very certain. Conversely, set comparator 506 could also be stricter upon terminating actions than creating them. Being stricter in one or both steps may lead to longer-lived actions and favor stability.

In various embodiments, set comparator 506 may make a tradeoff between the two above approaches by comparing the aggregated distributions using a distance metric and applying a threshold referred to as an "inertia parameter," which is the distance between the distributions $f_{Q_{default}}$ and $f_{Q_{optimal}}$ beyond which control engine 504 decides that an action should be issued as a recommendation to a network operator via a user interface.

Once control engine 504 has the aggregate distribution $f_{Q_i}$ for every path (sub)set $S_i$, it may compare them in order to evaluate a so-called risk factor, which essentially is the degree of overlap between the two distributions.

Figure 8:
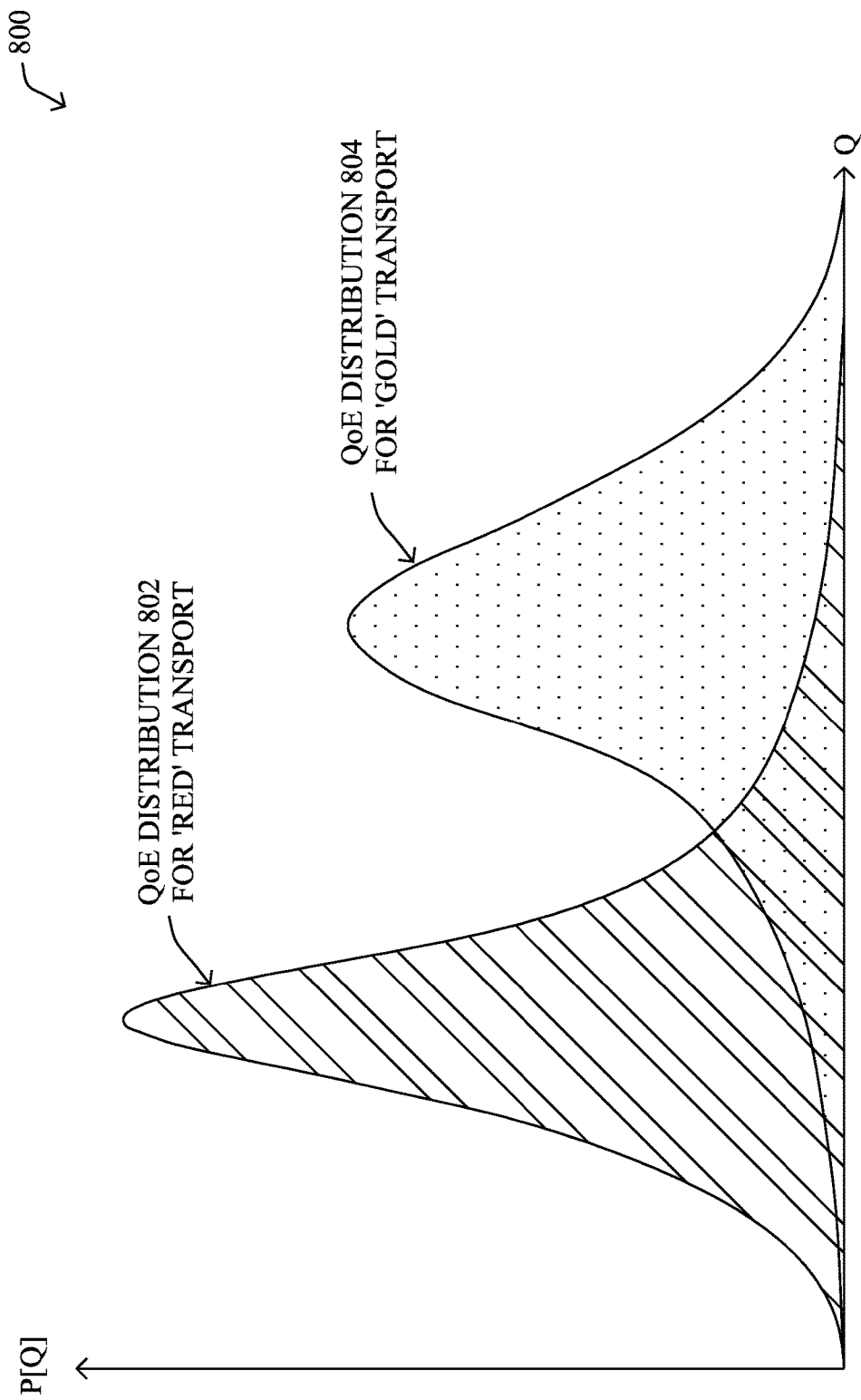
FIG. 8 illustrates an example plot of quality of experience (QoE) distributions for different transports.

FIG. 8 illustrates an example plot 800 of aggregate distributions of the application experience metric/QoE for two transports: a 'red' transport and a 'gold' transport. More specifically, distribution 802 represents the aggregated distribution $f_Q${red} and distribution 804 represents the aggregated distribution $f_Q${gold} obtained from the individual distributions of every path connected to transports red and gold, respectively.

The larger the overlap between distribution 802 and distribution 804, the less significant the expected benefit. In this case, the set {gold} is superior, on average, yet some overlap with {red} exists. Thus, swapping the application traffic from the red transport to the gold transport is not clear-cut, as there may be times where choosing gold over red will be detrimental to some users.

Referring again to FIG. 5, the distance function measured by set comparator 506 may take several forms, with the guiding principle that the larger the distance, the more significant the benefits of a change (or, depending on the direction, its detriments). Suitable distance measurements may include the Hellinger distance (which can be interpreted as a measure of the overlap between two distributions, since it reaches its maximum when one distribution assigns probability zero to every sample for which the other distribution assigns a positive probability, and vice versa) or the Kolmogorov-Smirnov distance (which measures the largest absolute difference between the cumulative distribution functions of both distributions across all values).

In further cases, set comparator 506 may also look at the distribution of the quality differences expected from switching from $Q_{default}$ to $Q_{optimal}$. Now, the risk of worsening the application experience is given by the negative part of the difference distribution. In a simple implementation outlined above, assuming Gaussian and independent quality distributions, the quality difference distribution is also Gaussian. A simple distance metric in this case would be mean of the difference distribution divided by its standard deviation. For example, a value of 2.0 in this metric would mean that the mean expected quality improvement is twice as large as the standard deviation of the expected quality improvement, and for Gaussian quality distribution this results in the very small risk of 2.3% of worsening the application experience.

Given a chosen distance function, the inertia parameters $\rho_C$ and $\rho_T$ can be defined, which apply to the creation and the termination of actions, respectively. In one embodiment, to create a new action, the distance between the optimal and the default path sets must be larger than $\rho_C$ and to terminate an existing action, the distance between the recommended set and the default set (the one that was originally configured by the network operator) must be larger than $\rho_T$. It should be noted here that the distance between the distributions is likely not a sufficient criterion to decide: their means must obviously be in the right order, e.g., upon creating an action, not only must the distributions be different, but the mean quality of the recommended set must be larger than the mean of the default one.

In various embodiments, predictive routing process 248 may also include policy engine 508, which allows a user to specify when recommendations should be generated (e.g., when the system should recommend a routing change). For example, the user may require different policies to be applied to different applications. For the sake of illustration, consider the case of a relatively low sensitive applications such as those related to web browsing. The user may want to increase the distances required between $Q_{default}$ and $Q_{optimal}$, to justify a change. Conversely, small distances may be required for application that are more sensitive to SLA violations, such as voice. Other criteria may be considered that relate to the disruptive nature of a routing policy change. Indeed, when applying such a change, this may affect the in-transit traffic with potential packet re-ordering. Thus, the user may optionally specify a constraint on the distance related to the risk of packet re-ordering (e.g., if the delays along paths in $Q_{optimal}$ and $Q_{default}$ are very different).

Predictive routing process 248 may also include lookback analyzer 510, which may measure the peak traffic $T_i$ observed in the past on a path $P_i$ such that no associated disruption was observed. In other words, $T_i$ is a lower bound of the bandwidth of path $P_i$. Then, lookback analyzer 510 may compute the predicted load on every path of the optimal set, which is given by the projected load divided by the cardinality of the set and verifies that it does not exceed T for this path. For instance, if the system expects 1 Mbps of traffic and the optimal set is {A, B}, the projected load on A and B, denoted respectively LA and LB, is 0.5 Mbps. Then, lookback analyzer 510 may validate that TA and TB are both larger than 0.5 Mbps. If this isn't the case, lookback analyzer 510 may increase the required distance between $Q_{optimal}$ and $Q_{default}$ proportionally to the ratio $L_i/T_i$. For instance, if the projected load is twice as high as the peak traffic observed on one of the paths (i.e., $L_i/T_i=2$), lookback analyzer 510 may require the difference between the distributions to be much larger than if the ratio is less than one.

Figure 9:
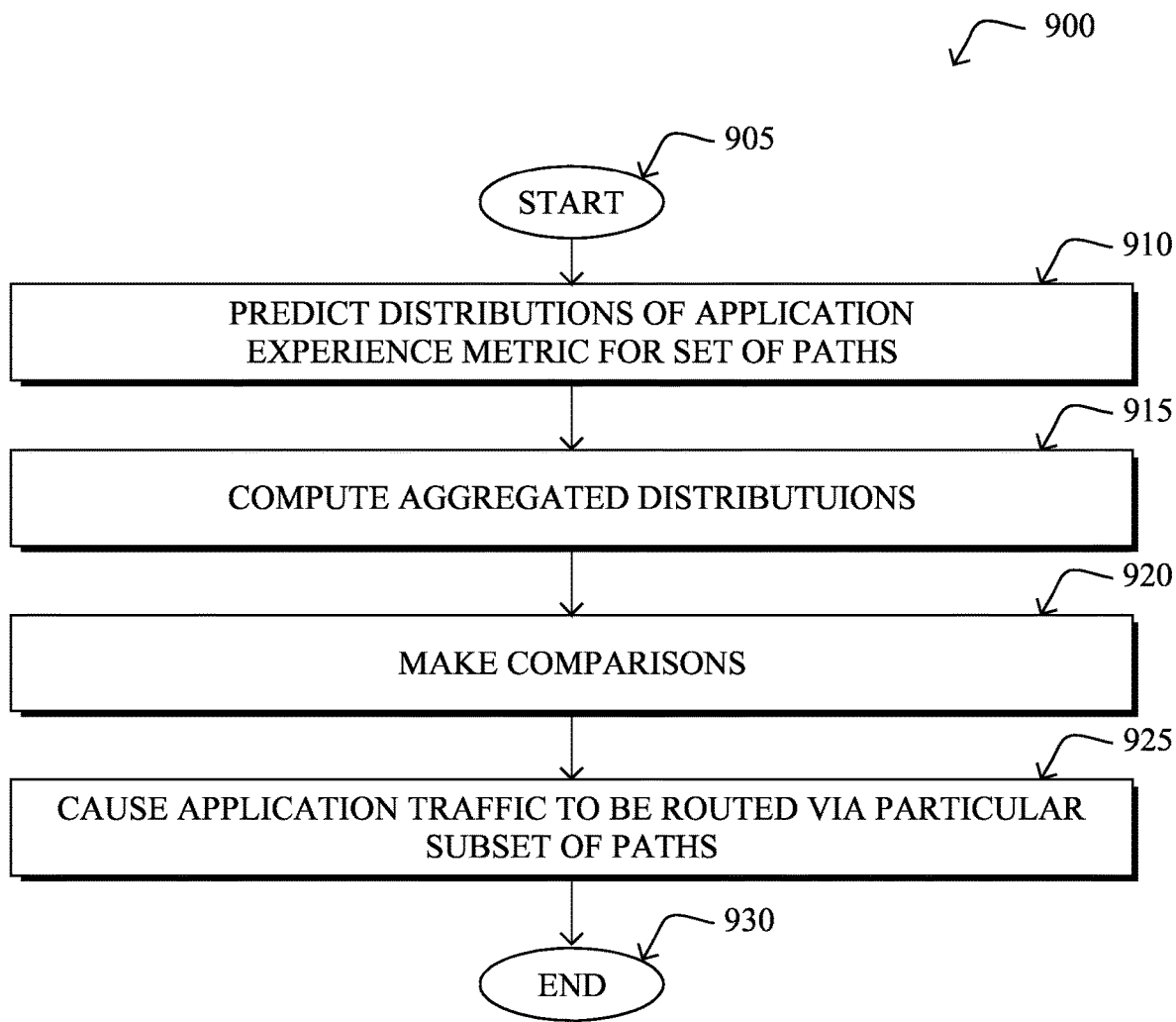
FIG. 9 illustrates an example simplified procedure for the adaptive selection of network paths based on long-term predictions of user experience.

FIG. 9 illustrates an example simplified procedure 900 (i.e., a method) for probing PoPs in a network, in accordance with one or more embodiments described herein. For example, a non-generic, specifically configured device (e.g., device 200), such as controller for a network (e.g., an SDN controller or other device in communication therewith,), a networking device, etc., may perform procedure 900 by executing stored instructions (e.g., predictive routing process 248). The procedure 900 may start at step 905, and continues to step 910, where, as described in greater detail above, the device may predict, for each of a set of paths via which traffic for an online application can be routed, a distribution of an application experience metric for the online application. In some embodiments, the application experience metric comprises at least one of: a transaction time for the online application, a mean opinion score (MOS) for the online application, or a user-specified satisfaction rating for the online application. In another embodiment, the application experience metric is computed based on a probability of a service level agreement (SLA) for the online application being violated. In one embodiment, the online application is a software-as-a-service (SaaS) application.

At step 915, as detailed above, the device may compute, for different subsets of the set of paths, aggregated distributions of their distributions of the application experience metric predicted by the device. As would be appreciated, the distributions predicted for the paths differ from singular, scalar values (e.g., point estimates), and may be predicted over a much larger timespan than the point estimates (e.g., on the order of weeks, months, etc., vs. an hour). Aggregation of the distributions may be performed in a number of ways, such as by using a Monte Carlo approach.

At step 920, the device may make comparisons between the aggregated distributions for the different subsets of the set of paths, as described in greater detail above. In various embodiments, the device may do so in part by determining whether the traffic for the online application should be rerouted based on a distance between an aggregated distribution for the default subset and an aggregated distribution of the particular subset. In further embodiments, the device may do so in part by determining whether rerouting the traffic for the online application from the default subset of the set of paths to the particular subset of the set of paths would result in an improvement to the application experience metric for the online application that exceeds a threshold defined by a user-specified policy. In additional embodiments, the device making comparisons between the aggregated distributions for the different subsets of the set of paths based in part on predicted traffic loads for the different subsets.

At step 925, as detailed above, the device may cause, based on the comparisons, the traffic for the online application to be routed via a particular subset of the set of paths. In some embodiments, the device may do so in part by providing a recommendation to a user interface that the traffic of the online application should be routed via the particular subset. In another embodiment, the device may do so in part by causing the traffic for the online application to be rerouted from a default subset of the set of paths to the particular subset of the set of paths. In one embodiment, paths in the particular subset are associated with a common site. Note that the device may also cause the routing to be implemented, such as by sending instructions to the associated routers, either automatically or after confirmation from a user regarding a provided recommendation. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the adaptive selection of network paths based on long-term predictions of user experience, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   predicting, by a device and for each of a set of paths via which traffic for an online application can be routed, a distribution of an application experience metric for the online application;
   computing, by the device and for different subsets of the set of paths, aggregated distributions of their distributions of the application experience metric predicted by the device;
   making, by the device, comparisons between the aggregated distributions for the different subsets of the set of paths; and
   causing, by the device and based on the comparisons, the traffic for the online application to be routed via a particular subset of the set of paths.

2. The method as in claim 1, wherein the application experience metric comprises at least one of: a transaction time for the online application, a mean opinion score (MOS) for the online application, or a user-specified satisfaction rating for the online application.

3. The method as in claim 1, wherein the application experience metric is computed based on a probability of a service level agreement (SLA) for the online application being violated.

4. The method as in claim 1, wherein causing the traffic for the online application to be routed via one of the different subsets of the set of paths comprises:
   providing a recommendation to a user interface that the traffic of the online application should be routed via the particular subset.

5. The method as in claim 1, wherein causing the traffic for the online application to be routed via the particular subset of the set of paths comprises:
   causing the traffic for the online application to be rerouted from a default subset of the set of paths to the particular subset of the set of paths.

6. The method as in claim 5, wherein making comparisons between the aggregated distributions for the different subsets of the set of paths comprises:
   determining whether the traffic for the online application should be rerouted based on a distance between an aggregated distribution for the default subset and an aggregated distribution of the particular subset.

7. The method as in claim 5, wherein making comparisons between the aggregated distributions for the different subsets of the set of paths comprises:
   determining whether rerouting the traffic for the online application from the default subset of the set of paths to the particular subset of the set of paths would result in an improvement to the application experience metric for the online application that exceeds a threshold defined by a user-specified policy.

8. The method as in claim 1, wherein paths in the particular subset are associated with a common site.

9. The method as in claim 1, wherein the device makes comparisons between the aggregated distributions for the different subsets of the set of paths based in part on predicted traffic loads for the different subsets.

10. The method as in claim 1, wherein the online application is a software-as-a-service (SaaS) application.

11. An apparatus, comprising:
    one or more network interfaces;
    a processor coupled to the one or more network interfaces and configured to execute one or more processes; and
    a memory configured to store a process that is executable by the processor, the process when executed configured to:
       predict, for each of a set of paths via which traffic for an online application can be routed, a distribution of an application experience metric for the online application;
       compute, for different subsets of the set of paths, aggregated distributions of their distributions of the application experience metric predicted by the apparatus;
       make comparisons between the aggregated distributions for the different subsets of the set of paths; and
       cause, based on the comparisons, the traffic for the online application to be routed via a particular subset of the set of paths.

12. The apparatus as in claim 11, wherein the application experience metric comprises at least one of: a transaction time for the online application, a mean opinion score (MOS) for the online application, or a user-specified satisfaction rating for the online application.

13. The apparatus as in claim 11, wherein the application experience metric is computed based on a probability of a service level agreement (SLA) for the online application being violated.

14. The apparatus as in claim 11, wherein the apparatus causes the traffic for the online application to be routed via one of the different subsets of the set of paths by:
    providing a recommendation to a user interface that the traffic of the online application should be routed via the particular subset.

15. The apparatus as in claim 11, wherein the apparatus causes the traffic for the online application to be routed via the particular subset of the set of paths by:
    causing the traffic for the online application to be rerouted from a default subset of the set of paths to the particular subset of the set of paths.

16. The apparatus as in claim 15, wherein the apparatus makes comparisons between the aggregated distributions for the different subsets of the set of paths by:
    determining whether the traffic for the online application should be rerouted based on a distance between an aggregated distribution for the default subset and an aggregated distribution of the particular subset.

17. The apparatus as in claim 15, wherein the apparatus makes comparisons between the aggregated distributions for the different subsets of the set of paths by:
    determining whether rerouting the traffic for the online application from the default subset of the set of paths to the particular subset of the set of paths would result in an improvement to the application experience metric for the online application that exceeds a threshold defined by a user-specified policy.

18. The apparatus as in claim 11, wherein paths in the particular subset are associated with a common site.

19. The apparatus as in claim 11, wherein the apparatus makes comparisons between the aggregated distributions for the different subsets of the set of paths based in part on predicted traffic loads for the different subsets.

20. A tangible, non-transitory, computer-readable medium storing program instructions that cause a device to execute a process comprising:
    predicting, by the device and for each of a set of paths via which traffic for an online application can be routed, a distribution of an application experience metric for the online application;

computing, by the device and for different subsets of the set of paths, aggregated distributions of their distributions of the application experience metric predicted by the device;
making, by the device, comparisons between the aggregated distributions for the different subsets of the set of paths; and
causing, by the device and based on the comparisons, the traffic for the online application to be routed via a particular subset of the set of paths.

* * * * *